United States Patent Office 2,975,066
Patented Mar. 14, 1961

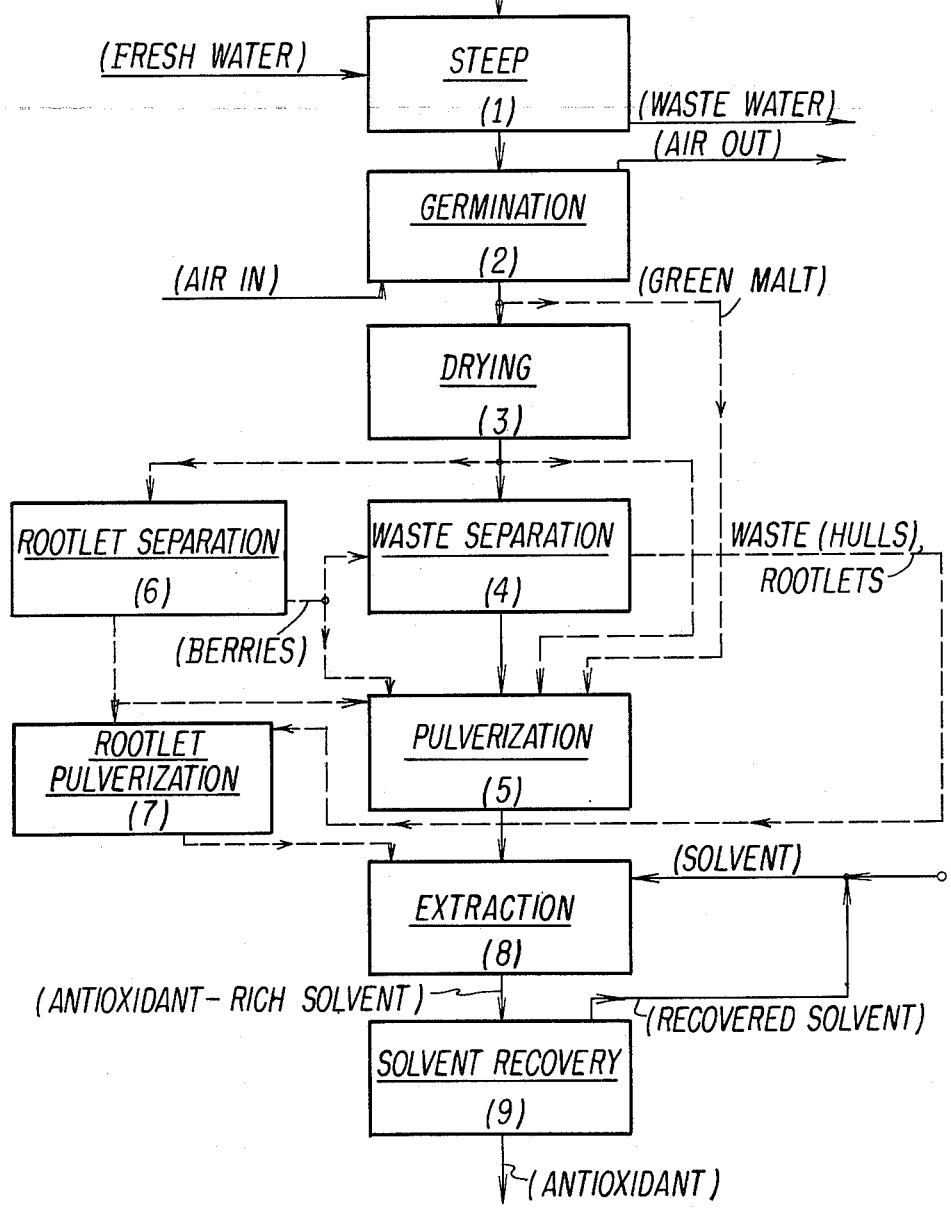

2,975,066

ANTIOXIDANT AND PROCESS FOR PREPARING THE SAME

Dwight L. Baker, Milwaukee, Wis., and Wilmer B. Dockstader, Clinton, Iowa, assignors to Basic Products Corporation, Milwaukee, Wis., a corporation of Wisconsin Filed Dec. 31, 1958, Ser. No. 784,325

26 Claims. (Cl. 99—163)

This invention relates to antioxidant substances derived from malted seeds of seed propagated plants. And it resides particularly in the isolation and use of an edible antioxidant obtained by malting barley or other seed followed by grinding the malted berry either alone or in conjunction with the rootlets or sprouts (which emanate from the berry during the malting process) or the rootlets alone and then extracting the pulverized mass with a solvent comprising a lower molecular weight alcohol. Following the grinding of such materials, the present invention provides particularly for extracting the resultant pulverized mass with a solvent comprising an alcohol, such as, methanol, ethanol, propanol, isopropanol, butanol, or isobutanol which may be combined with limited quantities of water. It is preferred to finely pulverize the malt or rootlets before subjecting the same to extraction inasmuch as more complete contact, accompanied by more complete extraction of the antioxidant bodies, is thereby attained. Some extraction can be effected without first pulverizing but it has been found that the more finely ground the malt product the greater the amount of antioxidant recoverable.

Antioxidants produced in accordance herewith are especially useful for delaying rancidification of edible fats and oils used for food and for feeds because they themselves are harmless for human animal consumption. The range of known and effective antioxidants, suitable for such purposes is quite restricted, and the more effective of those available have been limited in their utility because of their expense. While the primary usage of the antioxidants obtained in accordance herewith is in foods, they also have application to prevention of auto-oxidation of a wide variety of other organic substances and are not limited to use in foods.

It is an object of this invention to provide effective antioxidant substances which will be safe for consumption with human or animal foods.

Another object of this invention is to provide a means for concentrating the natural antioxidant properties of malted seeds of seed propagated plants.

Another object is to produce effective antioxidant substances which are low in cost and which may be derived from plentiful supplies of natural growing raw materials.

A further object of the invention is to provide a means for obtaining a very useful and profitable product from what has been essentially a waste product of the malting industry, namely, the rootlets which have heretofore been separated from the berries following the drying step and either discarded or sold for a few pennies a pound for purposes such as animal feed.

These and other objects and advantages will become apparent from the ensuing description when considered in conjunction with the accompanying drawing.

In the drawing is shown a flow diagram setting forth the alternative methods by which the grain may be processed in accordance herewith to obtain concentrated antioxidant from (1) the whole germinated seed, (2) the rootlets alone, (3) the berries or kernels alone (hulled or unhulled) or (4) a pulverized mixture of rootlets and berries.

The art is now aware that malted barley possesses some natural antioxidant properties. Thus, in an article appearing in the German publication Fette und Seifen [46, pages 554 to 560 (1939)] it is pointed out that coffee malt and brewer's malt have an antioxidant effect when added to olive oil or peanut oil. Moreover, one of the inventors of the present application coauthored an article (Food Technology 12, No. 1, pages 33–35; January 1958) which, in some detail, points out the utility of natural antioxidants derived from malt for the prevention of oxidation of fats and oils.

And in the copending application, Serial No. 566,131, filed February 17, 1956, in the names of Dwight L. Baker and Wilmer B. Dockstader (now Patent No. 2,925,345, granted February 16, 1960), the use of malt rootlets as antioxidants is claimed. The present application is a continuation-in-part of the aforementioned Baker et al. application for Letters Patent.

As pointed out in the aforementioned paper by Baker and Hellman appearing in Food Technology, the effective quantity of antioxidant derivable from the malt rootlets is somewhat lower than that obtainable from malt flour on a weight basis. However, the excellent antioxidant effect which can be obtained from these rootlets, which heretofore have been considered to be waste products, is, indeed, worth while not only to the malster but to persons in the food industry and elsewhere requiring a low cost, edible antioxidant.

The present invention is concerned with a method of concentrating the antioxidants present in malt flour and/or in the rootlets and, in particular, is directed to the use of solvent extraction of the various parts of the malted seed, either individually or in any combination, to obtain a concentrate of useful antioxidant.

In accordance herewith, suitable starting materials for the manufacture of the malt, from which the antioxidant materials herein described and claimed are obtained, include commercial grains, for example, wheat, rice, maize or barley and, in some instances rye, although the seeds of nearly all seed propagated plants in some measure appear to provide a source of antioxidant substance when treated in accordance with the invention. The starting seed, for example, barley, is first obtained in a mature condition after which it is cleaned and graded, and then introduced to the malting operation. The malting process, as such, which may be employed to produce the desired malted seed, is not novel to the preparation of the antioxidants herein described. For that reason, it will be reviewed here only briefly. Thus, the cleaned, graded and matured barley seeds are steeped in water for several days during which several changes of water occur, and the water content of the berries is raised to about 45%. Following the steeping operation the soaked or steeped berries are spread in layers and held in a ventilated malting area to carry out the germination of the grain. The temperature during this time is carefully maintained in the range of from about 55° F. to about 80° F.; generally for from one to six days and more usually from four to six days. At the end of the usual growing or sprouting period rootlet development is evident and the acrospire will have extended to a substantial degree from its original location in the embryo at the base of the barley berry or kernel. Normal germination is concluded when the acrospire has grown from about three quarters to the full length of the kernel in the majority of the kernels. This growth occurs beneath the hull of the barley and is not readily observable except by taking the hull off and examining a given barley kernel. When the acrospire has reached this point, growth is ordinarily concluded by kilning.

The kilning operation is a standard malting process during which time the temperature of the germinated berries is raised to not higher than about 200° F. and preferably somewhat below, and it is maintained at such temperature for a period of about two days. Ordinarily, the kilning operation occurs in two distinct phases, the first being approximately one day with the first sixteen hours being a gradual increase in heat applied to the kernels. At the end of the twenty-four hour period the malt is ordinarily dropepd to a lower kiln where it progresses through yet another drying period of about the same duration, concluding with a somewhat higher finishing temperature of about 160 to 180° F. or possibly somewhat higher. The moisture content after the first or initial drying of brewer's malt is reduced from 40 to 45% (which it had attained during the steeping operation and not measurably been reduced during germination) to about 8 to 14%. During the second period of kilning this moisture content is usually dropped to about 4%. As indicated above, the malt, and particularly malted barley, is prepared in accordance herewith according to standard malting processes employed in the industry and known to those skilled in the art.

It is at the completion of the normal malting operation that the process of the present invention is ordinarily initiated. However, it has been found that the green malt, i.e., the undried, germinated seed, may also be treated in accordance herewith to yield antioxidant. As shown in the accompanying flow diagram, there is a choice as to just how the antioxidant is to be concentrated. At the conclusion of the usual kilning step the rootlets or sprouts which have extended a substantial distance from the kernel during germination are separated from the berries, following which the berries are dehulled and pulverized to a flour.

Since the hull of the malted barley kernel has no detectable antioxidant property itself, and particularly because it is not entirely desirable in any food product in which the antioxidant might be employed, the usual and prefered techniques so far as the present invention is concerned, and in keeping with accepted malting processes, is to remove the hull in a waste disposal step prior to extracting the antioxidant values from the malt flour. However, if desired, and certainly from an economy standpoint, if one preferred to eliminate the dehulling operation it could be dispensed with. Thus, for example, where the antioxidant is to be employed for the purpose of inhibiting auto-oxidation of an inedible organic material such as rubber or any other such material subject to oxidation, the entire product coming from the germination step may be pulverized and extracted. On the other hand, the rootlets have a definite antioxidant content and they alone may be separated and pulverized, followed by extraction as hereinafter described.

According to the preferred method of recovering the antioxidant properties present in malted barley or other seeds of this type, the malt kernel separated from the sprouts or rootlets is purverized to a flour and, for purposes of this invention, the phrase "malt flour" shall refer to that pulverized material obtained by pulverizing the dehulled barley berry which had been previously separated from the rootlets. The dehulled malt, prior to pulverization, is usually called "pearled malt."

The pulverized material, whether it be rootlets or the mixture of rootlets and berries, or even combination of hulls, berries and rootlets, are, in accordance herewith, subjected to an extration with an alcohol having from one to four carbon atoms, and preferably with a solvent comprising methanol, ethanol, isopropanol or isobutanol. The monohydroxy aliphatic alcohols, methanol, ethanol, propanol, isopropanol, butanol and isobutanol are useful for this purpose. The extraction is preferably carried on by adding the pulverized malt derivative to refluxing solvent in a concentration of about 10 to 30%, and preferably about 20 to 25% by weight.

It should be understood, of course, that the concentration which is introduced to the refluxing solvent is not critical and one skilled in the art can readily determine if, under given circumstances, this range should be departed from.

It should be understood, however, that so far as the method of carrying out the extraction is concerned, the invention does not reside in the use of a refluxing system for conducting the extraction. Thus, a continuous process, wherein a tower or column of the pulverized mass is placed and the solvent passed either up or down through the column in a typical continuous system, is entirely suitable for purposes of this invention. In short, the process described is one of employing a low molecular weight alcohol of the type described for the purpose of extracting and concentrating from pulverized malt products this antioxdant material which is herein described and claimed. The techniques of liquid-solid extraction applicable are, of course, well known to those skilled in the art.

The solvent employed in extracting the antioxidant values from the malt material may be the 100% alcohol. However, it is preferred to employ relatively minor proportions of water and to thus have a mixture of water and alcohol as the solvent.

The amount of water employed with methanol or ethanol may vary from about 5% to about 25 or 30%, perhaps even more, but it is preferred to employ from about 10 to 20% water with such alcohols. It appears that a somewhat larger amount of water is desirable with isopropanol. As the molecular weight of the alcohol employed increases, the amount of water soluble in such alcohol decreases. Thus, as a practical matter, butanol is miscible with only about 15% water and a butanol solution saturated with water has been found desirable.

Mixtures of these various alcohols, with or without water, may be employed if desired.

Referring now to the drawing, the flow of materials along alternate paths to produce antioxidant from malted seed is shown. Thus, the seed, such as barley, is introduced to the normal steep stage 1 after which the steeped grain is passed to the germination zone 2. Ordinarily the green malt leaving the germination step goes directly to the kiln 3 for drying. However, as shown in the drawing, it may be sent to the grinding or pulverization stage 5 or directly (not shown) to the extraction zone 8. In what is the preferred method of operation, the green malt passes to the drying stage 3 where its water content is essentially completely removed. Upon leaving the kiln 3, there is considerable choice as to just how the operation may be continued. Thus, all or part of the whole, dried, malted seed may be sent to the waste separation step 4, where some of the hulls and all of the rootlets are removed from the now dry, friable berry. Alternatively, however, all or part of the material leaving drying zone 3 may be sent directly to the grinding step 5 or else it may be subjected first to rootlet separation in area 6 and then dehulling in zone 4. Also, the rootlet-free berries (still with their hulls) after leaving zone 6 may be sent directly to pulverization zone 5.

The rootlets separated in zone 6 may then be pulverized individually in zone 7 or recombined with the pearled malt coming from waste separation step 4 and pulverized in zone 5. In addition, when both rootlets and hulls are removed in zone 4 they may then be sent to the pulverization zone 7 and ground there with the rootlets from zone 6.

After the respective parts or the whole malted seed have been ground to desired fineness, they are then extracted in zone 8 in the manner hereinafter more fully described. It is to be understood, of course, that more than one extraction zone may be employed so as to avoid mixing of the various components.

After extraction is complete the solvent may, as desired, be recovered, purified and recycled to the extraction zone.

The following examples are intended to illustrate how the antioxidant values in malted seed may be isolated in accordance with the present invention. Such examples should not be interpreted as limiting the scope of the invention in any way.

*Example I*

Fifty grams of Raymond hammer-mill ground rootlets (mill equipped with a 1/64" exit screen) were contacted with five successive 200 cc. quantities of refluxing methanol. The composite antioxidant-rich solvent from the five refluxing operations was separated from the solid material by centrifuging and then evaporated to dryness, in a carbon dioxide atmosphere, to yield, based on original weight of rootlets, 17.7% or 8.85 grams of extract. A 5% by weight addition of this extract was then made to a sample of corn oil. That sample was then heated to 100° C. for 30 minutes, left to stand overnight and then reheated to 100° C. for two hours before centrifuging to remove the solids. A comparison of the protection afforded this sample of corn oil with a control sample free of added antioxidant showed that the peroxide value of the treated sample was not significantly greater after heating such example for ten hours at about 100° C., with oxygen bubbling therethrough, than that of the fresh corn oil. On the other hand, the peroxide value of the control sample after heating for this same period at about 100° C., with the oxygen bubbling through, was about 1000% greater than the thus treated sample. The peroxide value was measured by the method of Stuffins and Weatherall (Annalyst, 70, 403 (1945)).

*Example II*

A portion of the extract obtained by evaporating the composite antioxidant-rich solvent was redissolved in methanol and the solution divided into two equal portions. These samples were then admixed with two volumes of chloroform and ten volumes of acetone, respectively, in a carbon dioxide atmosphere. A substantial quantity of solid was precipitated from each solution upon the addition of these materials. The precipitated solids were further evaporated to dryness in a $CO_2$ atmosphere and then added to equal volume samples of corn oil in the amount of 0.01% by weight. After eight hours of bubbling oxygen through the samples held at 100° C., the perioxide values of the two treated samples were about equal although the chloroform precipitate was somewhat lower than that containing the acetone precipitated extract. Both were significantly lower than the peroxide value of a control sample of corn oil subjected to the same conditions.

*Example III*

Twenty grams of finely ground malt flour (normal "23G" brewer's malt flour, i.e., 95%, will pass through a 100 mesh screen, from which both rootlets and hulls had been removed before pulverization) were refluxed with 100 grams of methanol for a period of fifteen minutes. The antioxidant-rich solvent was separated from the extract solution by filtration and the extract was then divided and part was dried at room temperature for twenty-four hours. The solid residue obtained was dissolved in propylene glycol so that 1 milliliter contained the solid content from 5 milliliters of the original extract. Propylene glycol was selected since it is a solvent used for marketable forms of presently known antioxidants. 1 milliliter of this propylene glycol solution was added to 20 grams of prime steam lard and tested in the standard AOM assay to determine the extent of rancidification. A 25 cc. aliquot of the original undried extract was dried to a heavy syrup on a low heat hot plate (80° C.) while a stream of $CO_2$ was continuously directed against the evaporating surface. The dried residue obtained was suspended in 5 cc. of propylene glycol. 1 milliliter of this propylene glycol solution of $CO_2$ evaporated residue was then added to 20 grams of prime steam lard and tested in the standard AOM test to determine the extent of rancidification over varying periods.

One volume (100 cc.) of the original undried extract was admixed with two volumes of acetone and the resulting precipitate sucked nearly dry on a Buchner funnel. The precipitate was then given four further washes with fresh acetone and 150 mgm. of a white to grey solid was obtained. This solid was readily dissolved in propylene glycol in the proportions of 1 mgm./10 ml of propylene glycol and tested by the standard, AOM procedure.

A comparison of the relative antioxidant activities in prime steam lard of the original undried extract as well as the residues from both atmosphereic and $CO_2$-blanketed evaporation with the dried, acetone-precipitated solid showed that the original undried extract gave about twice the number of hours of protection as either that prepared by evaporation in a $CO_2$ atmosphere or the acetone precipitation. The activity of the residue prepared by simply evaporating at room temperature without $CO_2$ protection was found to be much reduced, indicating the desirablility, at least so far as methanol extraction is concerned, of blanket in the evaporating solvent with $CO_2$.

Other extractions similar to those described in the above examples were performed on both malt flour and ground rootlets with ethanol, propanol, isopranol and butanol. These solvents were employed in both the anhydrous condition and with water added. Methanol, too, was tested with water added. It was found that the effect of water addition was neither predictable nor uniform. Thus, water addition to methanol up to a content of about 10% water (for the whole undried rootlet extract) seemed to give a very slight improvement in the activity of the extract but to fall slightly as a greater amount was added until 20% was reached. With a solvent comprising 30% water content, the activity of the extract was found to be substantially zero. On the other hand, water addition to isopropanol showed a very significant increase in the activity of the whole undried extract produced from ground rootlets. Thus, samples of prime steam lard to which there had been added 1 cc. of the original undried extract exhibited the following hours of protection/gram of original malt rootlets in the AOM test:

| Solvent | Activity in AOM Test—Hrs. Protection/gm. of Malt Rootlets |
|---|---|
| Isopropanol, 0% $H_2O$ | 10 |
| Isopropanol, 10% $H_2O$ | 30 |
| Isopropanol, 20% $H_2O$ | 65-70 |
| Isopropanol, 30% $H_2O$ | 30 |

The use of an atmosphere of $CO_2$ during the actual extraction has been found to give some striking, if not unexplainable results. Thus, comparable extractions of malt rootlets using anhydrous methanol as well as various aqueous dilutions thereof were carried out with and without a $CO_2$ blanket. The effectiveness of one cc. of the undried original extracts from these experiments in inhibiting the rancidification of prime steam lard is shown below:

| Solvent | Yield [1] (gms.) | Activity in AOM Test—Hrs. Protection/gm. of Malt Rootlets | |
|---|---|---|---|
| | | (No $CO_2$) | (With $CO_2$) |
| Methanol+0% $H_2O$ | 1.85 | 2.0 | 2.5 |
| Methanol+10% $H_2O$ | 8.5 | 2.5 | 32 |
| Methanol+20% $H_2O$ | 9.6 | 1.5 | 40 |
| Methanol+30% $H_2O$ | 14.9 | 0 | 20 |

[1] Based on 100 g. of original rootlets extracted.

As may be seen from the foregoing, the final recovery or concentration of the active antioxidant which is derived from malted seeds, in accordance herewith, may be effected in various ways. Indeed, the solvent-wet extract itself (either partially evaporated to remove most of the solvent or an aliquot of the antioxidant-rich solvent) may be used effectively to inhibit auto-oxidation of either fats or oils. Generally speaking, it has been found that efforts to completely dry an extract, even in a $CO_2$ atmosphere, result in somewhat less overall antioxidant effectiveness. This seems to indicate that there is room for improvement in the methods of final isolation and protection of the active antioxidant material. Nevertheless, by the present invention, it has been found possible to recover highly active antioxidants from malted grain and to effectively add the same to oleaginous materials, such as animal and vegetable fats and oils.

While acetone has been specifically referred to above as a material capable of precipitating the active antioxidant substituents from the solvent, it should be understood that other organic solvents, such as chloroform, methyl ethyl ketone and ethyl ether may also be used if desired. However, for practical purposes acetone has been found most desirable.

While it is preferred that a grain such as barley, wheat, oats or rice be employed as the source of material for the antioxidant of this invention, when the same is to be employed in an edible product, there are numerous uses for antioxidant substances for the protection of non-edible materials. Such substances find usefulness for delaying the aging of rubber, for inhibiting the formation of gums in petroleum products and for establishing and controlling the drying of protective film coatings and for other purposes. A grain, such as rye, may furnish a suitable source of non-edible antioxidant but it will be found that linseed and other crop seeds, such as soy beans and other commercial legumes, depending upon availability and cost, may, at times, be preferable sources.

While some fatty seeds, such as linseed and sesame may furnish a greater yield of antioxidant, its character may be such as to exert its protective action in company with undesirable contributions to flavor or over a shorter interval than is exhibited by antioxidant derived from other plants. It is necessary, therefore, to determine the use for which the antioxidant is required, before selecting the seed to be used as a source material.

One of the more exacting requirements of antioxidant is for protection of shortening used in bakery goods, such as crackers and cookies. Because of the cellular character of such materials and the large surface which is exposed, shortening contained becomes particularly susceptible to rancidification. This is aggravated by the fact that final cooking temperatures in the crust rise to a fairly high level. Antioxidant substances are, therefore, required which will protect against strong oxygen attack and which will, nevertheless, remain active and effective event though subjected to the high temperatures mentioned. Antioxidants stable at high temperatures are similarly required for protecting products prepared by deep fat frying with oils. The antioxidants derivable from malt are particularly desirable for these applications because of their unique effectiveness at elevated temperatures.

We claim as our invention:

1. A process which comprises subjecting seed to sprouting conditions, terminating growth in the early sprouting stage while drying the sprouted seed at a temperature not exceeding 200° F., subjecting any part of the sprouted seed other than the hull alone to solvent extraction with a solvent comprising a monohydroxy alcohol containing from 1 to 4 carbon atoms whereby antioxidant material is extracted from said part of the sprouted seed.

2. The process of claim 1 wherein any part of the sprouted seed is pulverized before being subjected to solvent extraction.

3. The process of claim 1 wherein the antioxidant material is concentrated by evaporation of at least a part of said solvent.

4. The process of claim 3 wherein the concentration by evaporation is carried out in an atmosphere consisting essentially of carbon dioxide.

5. The process of claim 1 wherein the antioxidant material is substantially removed from said solvent by admixing with the antioxidant-rich solvent a material selected from the group consisting of acetone, chloroform, methyl ethyl ketone and ethyl ether whereby said antioxidant material is precipitated from said solvent.

6. The process of claim 1 wherein the solvent extraction is carried out in an atmosphere consisting essentially of carbon dioxide.

7. The process of claim 1 wherein the part of the sprouted seed which is subjected to solvent extraction comprises the rootlets, and said rootlets are pulverized prior to said solvent extraction.

8. The process of claim 1 wherein the part of the sprouted seed which is subjected to solvent extraction comprises the substantially rootlet-free berries and the same are pulverized prior to said solvent extraction.

9. The process of claim 7 wherein the seed is barley and the antioxidant material is concentrated by evaporation of at least a part of said solvent.

10. The process of claim 8 wherein the seed is barley and the antioxidant material is concentrated by evaporation of at least a part of said solvent.

11. The process of claim 9 wherein the concentration by evaporation is carried out in an atmosphere consisting essentially of carbon dioxide.

12. The process of claim 10 wherein the concentration by evaporation is carried out in an atmosphere consisting essentially of carbon dioxide.

13. The process of claim 7 wherein the seed is barley and the antioxidant material is substantially removed from said solvent by admixing with the antioxidant-rich solvent a material selected from the group consisting of chloroform, acetone, methyl ethyl ketone and ethyl ether whereby said antioxidant material is precipitated from said solvent.

14. The process of claim 8 wherein the seed is barley and the antioxidant material is substantially removed from said solvent by admixing with the antioxidant-rich solvent a material selected from the group consisting of chloroform, acetone, methyl ethyl ketone and ethyl ether whereby said antioxidant material is precipitated from said solvent.

15. A process which comprises subjecting barley to sprouting conditions, terminating growth in the early sprouting stage while drying the sprouted seed at a temperature not exceeding 200° F., separating the rootlets from the berries, pulverizing the rootlets, subjecting the pulverized rootlets to solvent extraction with a solvent comprising from about 80 to about 90% methanol and from about 10 to about 20% water by volume at about the refluxing temperature of said solvent, separating the antioxidant-rich solvent from the remainder of the pulverized rootlets and separating the extracted antioxidant material from said solvent by admixing therewith a material selected from the group consisting of acetone, methyl ethyl ketone, chloroform and ethyl ether and recovering the precipitated antioxidant material.

16. The process of claim 15 wherein the solvent extraction is carried out in an atmosphere consisting essentially of carbon dioxide.

17. The antioxidant material for use in the inhibition of auto-oxidation of organic materials prepared in accordance with claim 1.

18. The antioxidant material for use in the inhibition of auto-oxidation of organic materials prepared in accordance with claim 5.

19. The antioxidant material for use in the inhibition of auto-oxidation of organic materials prepared in accordance with claim 7.

20. The antioxidant material for use in the inhibition of auto-oxidation of organic materials prepared in accordance with claim 8.

21. The antioxidant material for use in the inhibition of auto-oxidation of organic materials prepared in accordance with claim 15.

22. A composition comprising organic material susceptible to auto-oxidation and an amount of the antioxidant material of claim 17 sufficient to significantly inhibit the auto-oxidation of such material.

23. A composition comprising organic material susceptible to auto-oxidation and an amount of the antioxidant material of claim 18 sufficient to significantly inhibit the auto-oxidation of such material.

24. A composition comprising organic material susceptible to auto-oxidation and an amount of the antioxidant material of claim 19 sufficient to significantly inhibit the auto-oxidation of such material.

25. A composition comprising organic material susceptible to auto-oxidation and an amount of the antioxidant material of claim 20 sufficient to significantly inhibit the auto-oxidation of such material.

26. A composition comprising organic material susceptible to auto-oxidation and an amount of the antioxidant material of claim 21 sufficient to significantly inhibit the auto-oxidation of such material.

References Cited in the file of this patent

UNITED STATES PATENTS

| | | |
|---|---|---|
| 2,627,464 | Kehetian | Feb. 3, 1953 |
| 2,694,011 | Frieden et al. | Nov. 9, 1954 |

OTHER REFERENCES

Taufel et al.: Fette und Seifen, vol. 46, pages 554 to 560 (1939).